(12) United States Patent
Shih

(10) Patent No.: US 10,532,932 B2
(45) Date of Patent: Jan. 14, 2020

(54) LOW TEMPERATURE CARBONIZABLE MATERIAL

(71) Applicant: Chaoyang University of Technology, Taichung (TW)

(72) Inventor: Yeng-Fong Shih, Taichung (TW)

(73) Assignee: CHAOYANG UNIVERSITY OF TECHNOLOGY, Taichung (TW)

( * ) Notice: Subject to any disclaimer, the term of this patent is extended or adjusted under 35 U.S.C. 154(b) by 182 days.

(21) Appl. No.: 15/603,432

(22) Filed: May 23, 2017

(65) Prior Publication Data

US 2018/0339903 A1  Nov. 29, 2018

(51) Int. Cl.
| | |
|---|---|
| C09K 3/00 | (2006.01) |
| C01B 32/05 | (2017.01) |
| C10B 57/06 | (2006.01) |
| C10B 53/02 | (2006.01) |

(52) U.S. Cl.
CPC .............. *C01B 32/05* (2017.08); *C10B 53/02* (2013.01); *C10B 57/06* (2013.01)

(58) Field of Classification Search
None
See application file for complete search history.

(56) References Cited

U.S. PATENT DOCUMENTS

| | | | | |
|---|---|---|---|---|
| 3,097,177 A | * | 7/1963 | Emerson | D21J 7/00 524/499 |
| 3,463,746 A | * | 8/1969 | Murdock | C08L 97/02 428/403 |
| 3,527,564 A | * | 9/1970 | Tesoro | D01F 9/16 264/DIG. 19 |
| 3,752,721 A | * | 8/1973 | Clark et al. | B29C 70/08 156/148 |
| 6,187,713 B1 | * | 2/2001 | Gadkaree | B01J 20/0266 502/423 |
| 6,207,255 B1 | * | 3/2001 | Fukuura | B01D 39/083 428/175 |
| 6,492,444 B1 | * | 12/2002 | Blount | C08K 3/32 106/18.14 |
| 2011/0105649 A1 | * | 5/2011 | Harada | C08B 7/00 524/30 |
| 2016/0053089 A1 | * | 2/2016 | Yoo | C08G 63/08 524/126 |

* cited by examiner

*Primary Examiner* — Joseph D Anthony
(74) *Attorney, Agent, or Firm* — Bruce Stone LLP; Joseph A. Bruce

(57) ABSTRACT

A low temperature carbonizable material and the method for making the same, wherein polyester polymer material, biomass material, and phosphorous catalyst are used as raw materials for making low temperature carbonization material, the phosphorous catalyst catalyzes polyester polymer fracture to produce alcohol group and acid group, which forms a catalytic chain reaction to further catalyze the carbonization reaction of the biomass material. Besides, the catalytic chain reaction can also effectively lower the carbonization temperature, which allows the carbonization process to be completed within 30 minutes at a temperature of 170 to 250° C., and the obtained product can be more easily processed into desired shaped or pressed into films.

7 Claims, 17 Drawing Sheets

```
Current Data Parameters
NAME                     lin
EXPNO                      1
PROCNO                     1

F2 - Acquisition Parameters
Date_              20161005
Time                  11.45
INSTRUM               spect
PROBHD    4 mm MAS BB/1H
PULPROG               cp.au
TD                     2048
SOLVENT
NS                     1880
DS                        0
SWH              41666.668 Hz
FIDRES              20.345053 Hz
AQ                0.0246260 sec
RG                      128
DW                   12.000 usec
DE                   17.00 usec
TE                   300.0 K
CNST11             1.0000000
D1                 2.0000000 sec
ZGOPTNS ======== CHANNEL f1 ========
NUC1                    13C
P15                 1000.00 usec
PLW1             64.00000000 W
SFO1            100.6313120 MHz ======== CHANNEL f2 ========
CNST21             1.0000000
CPDPRG2             spinal64
NUC2                     1H
P3                     2.70 usec
PCPD2                  4.80 usec
PLW2        0 W
PLW12            95.00000000 W
SFO2            400.1680000 MHz
SPNAM0              ramp.100
SPOAL0                 0.500
SPOFFS0     0 Hz
SPW0             47.75294113 W F2 - Processing parameters
SI                    16384
SF              100.6220657 MHz
WDW                      EM
SSB         0
LB          0 Hz
GB          0
PC                     0.30
```

FIG.14B

```
Current Data Parameters
NAME                huang
EXPNO                   2
PROCNO                  1

F2 - Acquisition Parameters
Date_            20111229
Time                15.37
INSTRUM              spect
PROBHD    4 mm MAS BB/1H
PULPROG              cp.4u
TD                   1024
SOLVENT
NS                   8000
DS                      0
SWH           41666.668 Hz
FIDRES        40.690105 Hz
AQ            0.0123380 sec
RG                    128
DW               12.000 usec
DE               17.00 usec
TE                300.0 K
CNST11          1.0000000
D1             2.00000000 sec
ZGOPTNS ------- CHANNEL f1 --------
NUC1                  13C
P15             1000.00 usec
PLW1          60.00000000 W
SFO1          100.6313120 MHz ------- CHANNEL f2 --------
CNST21          1.0000000
CPDPRG2           spinal64
NUC2                   1H
P3                 2.70 usec
PCPD2              4.80 usec
PLW2       0 W
PLW12         95.00000000 W
SFO2          400.1669000 MHz
SPNAM0            ramp.100
SPOAL0              0.500
SPOFFS0    0 Hz
SPW0          47.75294113 W F2 - Processing parameters
SI                  16384
SF            100.6216845 MHz
WDW                    EM
SSB        0
LB         0 Hz
GB         0
PC                   0.30
```

FIG.15B

```
Current Data Parameters
NAME                          lin
EXPNO                           3
PROCNO                          1

F2 - Acquisition Parameters
Date_                    20161007
Time                         8.37
INSTRUM                     spect
PROBHD     4 mm MAS BB/1H
PULPROG                     cp.au
TD                           2048
SOLVENT
NS                          12013
DS                              0
SWH                  41666.668 Hz
FIDRES                20.345053 Hz
AQ                    0.0246260 sec
RG                            128
DW                       12.000 usec
DE                       17.00 usec
TE                          300.0 K
CNST11                  1.0000000
D1                      1.50000000 sec
ZGOPTNS ======== CHANNEL f1 ========
NUC1                          13C
P15                     1000.00 usec
PLW1                 64.00000000 W
SFO1                100.6313120 MHz ======== CHANNEL f2 ========
CNST21                  1.0000000
CPDPRG2                   spinal64
NUC2                           1H
P3                         2.70 usec
PCPD2                      4.80 usec
PLW2      0 W
PLW12                95.00000000 W
SFO2                400.1680000 MHz
SPNAM0                    ramp.100
SPOAL0                      0.500
SPOFFS0   0 Hz
SPW0             47.75294113 W F2 - Processing parameters
SI                          16384
SF                  100.6220657 MHz
WDW                            EM
SSB       0
LB        0 Hz
GB        0
PC                           0.30
```

FIG.16B

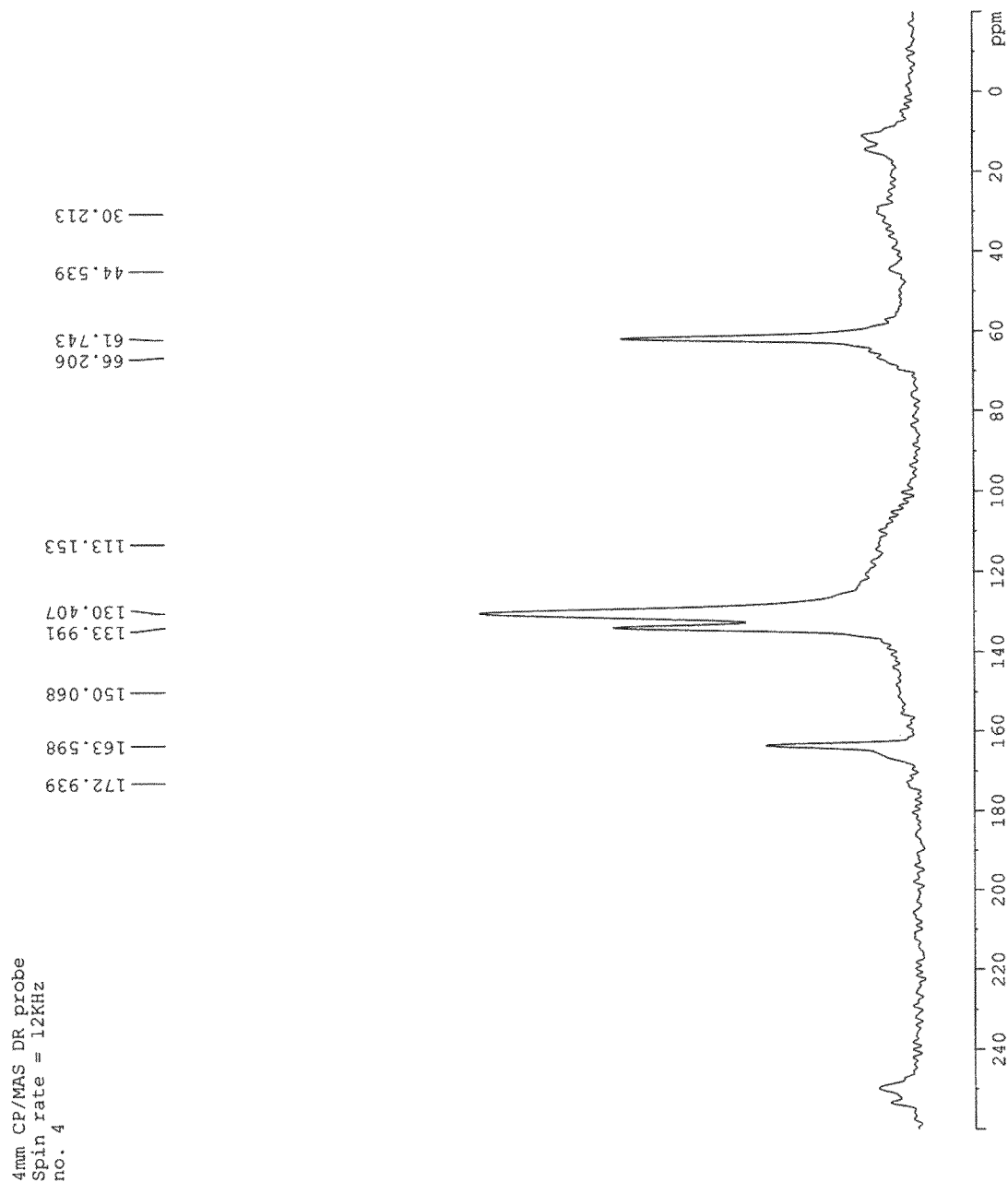

```
Current Data Parameters
NAME                      lin
EXPNO                       4
PROCNO                      1

F2 - Acquisition Parameters
Date_              20161011
Time                  16.18
INSTRUM               spect
PROBHD    4 mm MAS BB/1H
PULPROG               cp.au
TD                     2048
SOLVENT
NS                     8000
DS                        0
SWH             41666.668 Hz
FIDRES          20.345053 Hz
AQ               0.0246260 sec
RG                      128
DW                 12.000 usec
DE                 17.00 usec
TE                  300.0 K
CNST11            1.0000000
D1               1.50000000 sec
ZGOPTNS ======== CHANNEL f1 ========
NUC1                    13C
P15              1000.00 usec
PLW1            64.00000000 W
SFO1           100.6313120 MHz ======== CHANNEL f2 ========
CNST21            1.0000000
CPDPRG2             spinal64
NUC2                     1H
P3                  2.70 usec
PCPD2               4.80 usec
PLW2        0 W
PLW12          95.00000000 W
SFO2           400.1680000 MHz
SPNAM0              ramp.100
SPOAL0                 0.500
SPOFFS0     0 Hz
SPW0           47.75294113 W F2 - Processing parameters
SI                    16384
SF             100.6220657 MHz
WDW                      EM
SSB         0
LB          0 Hz
GB          0
PC                     0.30
```

FIG.17B

```
Current Data Parameters
NAME                       lin
EXPNO                      201
PROCNO                       1

F2 - Acquisition Parameters
Date_                 20161006
Time                      9.40
INSTRUM                  spect
PROBHD     4 mm MAS BB/1H
PULPROG              hpdec.au
TD                        4096
SOLVENT
NS                         200
DS                           0
SWH              83333.336 Hz
FIDRES            20.345053 Hz
AQ                0.0246260 sec
RG                          32
DW                    6.000 usec
DE                   10.00 usec
TE                    298.0 K
CNST11            1.0000000
D1               30.00000000 sec
ZGOPTNS ======== CHANNEL f1 ========
NUC1                      31P
P1                    2.00 usec
PLW1             38.00000000 W
SFO1            161.9907370 MHz ======== CHANNEL f2 ========
CPDPRG2                tppm15
NUC2                       1H
PCPD2                 4.80 usec
PLW2          0 W
PLW12            45.00000000 W
SFO2            400.1690000 MHz F2 - Processing parameters
SI                        8192
SF              161.9906865 MHz
WDW                         EM
SSB           0
LB            0 Hz
GB            0
PC                        0.40
```

FIG.18B

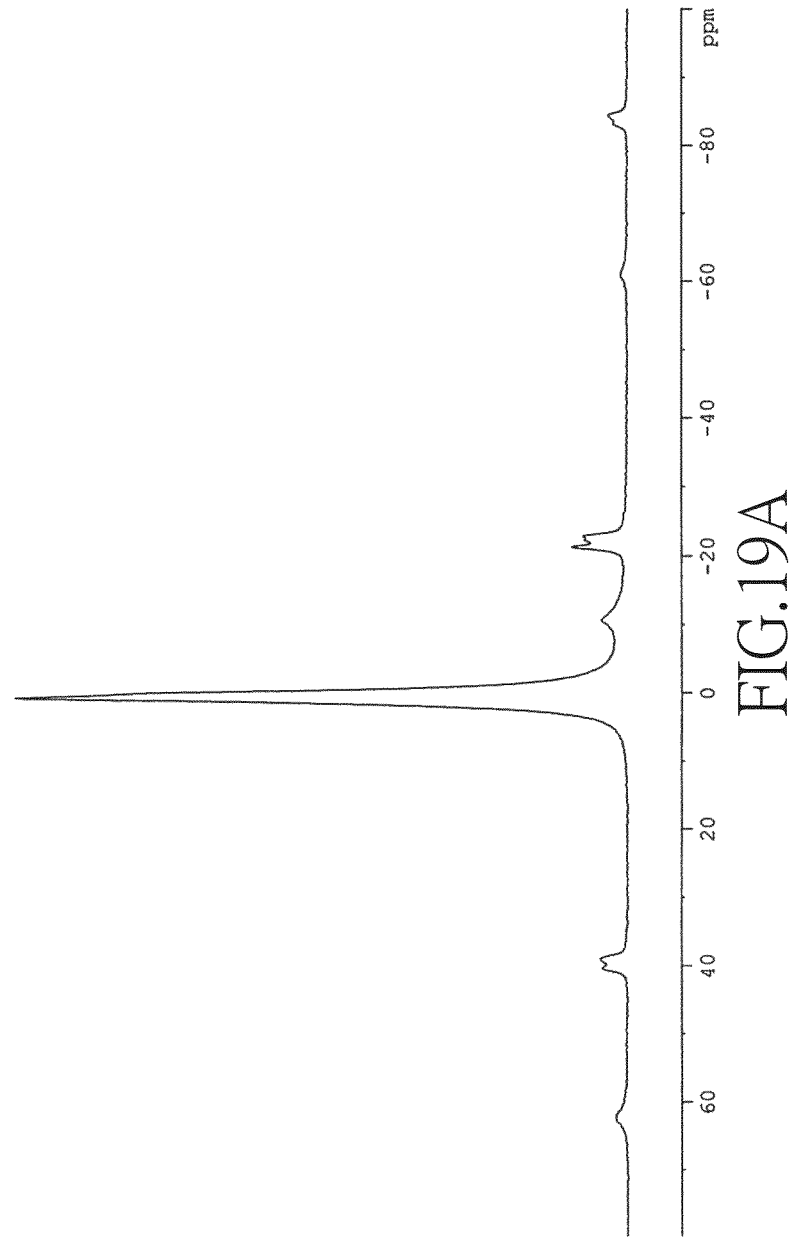

```
Current Data Parameters
NAME                     lin
EXPNO                    301
PROCNO                     1

F2 - Acquisition Parameters
Date_             20161007
Time                 14.55
INSTRUM              spect
PROBHD     4 mm MAS BB/1H
PULPROG           hpdec.au
TD                    4096
SOLVENT
NS                     201
DS                       0
SWH             83333.336 Hz
FIDRES          20.345053 Hz
AQ               0.0246260 sec
RG                      32
DW                   6.000 usec
DE                  10.00 usec
TE                   298.0 K
CNST11           1.0000000
D1             30.00000000 sec
ZGOPTNS ======== CHANNEL f1 ========
NUC1                   31P
P1                    2.00 usec
PLW1           38.00000000 W
SFO1          161.9907370 MHz ======== CHANNEL f2 ========
CPDPRG2             tppm15
NUC2                    1H
PCPD2                 4.80 usec
PLW2       0 W
PLW12          45.00000000 W
SFO2          400.1690000 MHz F2 - Processing parameters
SI                    8192
SF            161.9906865 MHz
WDW                     EM
SSB       0
LB        0 Hz
GB        0
PC                    0.40
```

FIG.19B

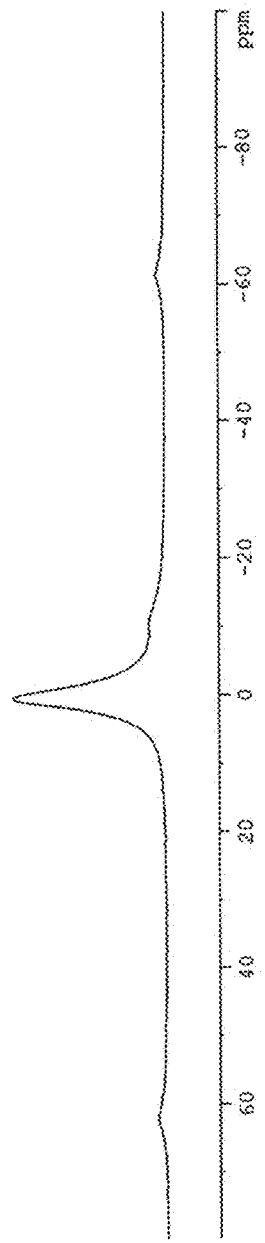

```
Current Data Parameters
NAME                       lin
EXPNO                      401
PROCNO                       1

F2 - Acquisition Parameters
Date_               20161010
Time_                   9.17
INSTRUM                 spect
PROBHD     4 mm MAS BB/1H
PULPROG             hpdec.au
TD                      4096
SOLVENT
NS                       200
DS                         0
SWH              83333.336 Hz
FIDRES           20.345053 Hz
AQ                0.0246260 sec
RG                        32
DW                    6.000 usec
DE                   10.00 usec
TE                   298.0 K
CNST11            1.0000000
D1               30.00000000 sec
ZGOPTNS ======== CHANNEL f1 ========
NUC1                     31P
P1                    2.00 usec
PLW1             38.00000000 W
SFO1            161.9907370 MHz ======== CHANNEL f2 ========
CPDPRG2               tppm15
NUC2                      1H
PCPD2                 4.80 usec
PLW2        0 W
PLW12            45.00000000 W
SFO2            400.1690000 MHz F2 - Processing parameters
SI                      8192
SF              161.9906865 MHz
WDW                       EM
SSB          0
LB           0 Hz
GB           0
PC                      0.40
```

FIG.20B

LOW TEMPERATURE CARBONIZABLE MATERIAL

BACKGROUND

Field of the Invention

The present invention relates to a carbonization material, and more particularly to a carbonizable material which is formed at a low temperature in an environmental friendly way, and a method for making the carbonizable material.

Related Prior Art

Most of the carbon containing materials can be carbonized through different processes. Carbonization per se is a thermal cracking reaction, which is a chemical decomposition reaction wherein solid or liquid organic matter are heated in a hypoxic environment to cause chemical bonding fracture or damage of the organic matter. The carbonation reaction is endothermic reaction, therefore, the reactor heat transfer mode and efficiency is the top priority in choosing carbonization reaction equipment. Plant material and processing waste are often seen biomass material in carbonization production, which include wood, stone, shell, pulping wastewater, waste tires and so on. In the carbonization process, most of the non carbon elements, such as hydrogen and oxygen, are converted into volatile products by the cracking process and are removed, and the carbon atoms form carbide in the form of aromatic ring.

The carbonization includes low temperature carbonization and high temperature carbonization. The low temperature carbonization reaction requires a very large amount of activation energy, and the reaction rate is therefore very slow. At a high temperature below 800° C., the carbonization reaction is controlled by diffusion rate. At present, the carbonization of the polymer material or raw material is carried out in high temperature furnace to perform the pyrolysis at a temperature above 500° C. For example, the carbonization of the rice husk and sorghum shell is performed at a temperature of 700 to 900° C. for 30 to 120 minutes.

It is learned from the above description that the existing carbonization technology requires expensive equipment investment and consumes huge energy. It should be noted that the products from the abovementioned carbonization process are mostly solid and therefore have the disadvantages of less plasticity and are difficult to process, which result in a low added value and limited applicability.

Besides, the current development trend of waste heat treatment technology has shifted from waste incineration to carbonization technology. Namely, carbonizing the organic matter, and recycling of the carbonization caused energy and products can not only reduce the dependence on foreign resources, but also effectively reduce the load of waste disposal, and extend the service life of the landfill. A part of the carbon components of the organic matter is converted into carbon containing matter. The carbon containing matter can be used as alternative fuel, and the treatment process can also reduce the $CO_2$ emission, which is in line with the global demand for $CO_2$ emission reduction.

The present invention has arisen to mitigate and/or obviate the afore-described disadvantages.

SUMMARY

One objective of the present invention is to provide a low temperature carbonizable material and a method for making the same. With the method for forming carbonizable film by using the low temperature carbonizable material, the present invention is capable of saving energy, reducing the $CO_2$ emission and the industrial cost. Besides, the waste polyester polymer and biomass material can also be used as raw material for carbonization, which can reduce the amount of garbage hoarding, making the waste resource recyclable.

To achieve the above objective, a low temperature carbonizable material provided by the invention comprises: 30-60 wt % polyester polymer material; 20-50 wt % biomass material; and 20-50 wt % phosphorous catalyst which catalyzes polyester polymer fracture to produce alcohol group and acid group.

Preferably, the polyester polymer material is selected from the group consisting of general polyester, biodegradable polyester and waste polyester polymer material.

Preferably, the polyester polymer material is selected from a group consisting of polylactic acid, polybutylene succinate and polyethylene terephthalate.

Preferably, the biomass material is selected from a group consisting of cellulose or lignin containing agricultural material and agricultural wastes containing lignin or cellulose.

Preferably, the biomass material is selected from a group consisting of pineapple fiber, nano pineapple fiber and bamboo fiber.

Preferably, the phosphorous catalyst is selected from a group consisting of phosphoric acid, phosphoric acid compounds, amine phosphate and amine phosphate compounds.

Preferably, the low temperature carbonizable material has a surface resistance of $2 \times 10^2$ to $2 \times 10^5 \Omega/\square$.

A method for making a low temperature carbonizable material in accordance with the present invention, comprises:

a step of material preparation: providing the polyester polymer material, the biomass material, and the phosphorous catalyst;

a step of heating: heating the polyester polymer material to a soft state; and a step of blending: blending the polyester polymer material which has been softened in the previous step with the biomass material and the phosphorous catalyst at a blending temperature 170 to 250° C.

Preferably, the step of blending further comprises a stirring step which is performed by a stirring device stirring at a stirring speed of 50-80 rpm.

Preferably, the stirring step is performed for 10-30 minutes.

With the polyester polymer material, the biomass material and the phosphorous catalyst, carbonization process can be performed at a lower temperature with less time as compared to the conventional art. The obtained products can be processed into desired shapes or even pressed into films, therefore, the products of the present invention can be further processed into activated carbon, fire retardant, thermal conductive material, reinforcing material, etc. Besides, the catalytic chain reaction of the phosphorous catalyst allows carbonization to be performed at a low temperature without the use of furnace, which is not only environmental friendly, but also effectively reduces the cost.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be

BRIEF DESCRIPTION OF THE DRAWINGS

FIG. 14B shows the analysis data of FIG. 14A;

FIG. 15B shows the analysis data of FIG. 15A;

FIG. 16B shows the analysis data of FIG. 16A;

FIG. 17A shows the $^{13}$C solid state NMR analysis of the polyester+the phosphorous catalyst+plant fiber of the invention;

FIG. 17B shows the analysis data of FIG. 17A;

FIG. 18B shows the analysis data of FIG. 18A;

FIG. 19A shows the $^{31}$P solid state NMR analysis of the phosphorous catalyst+plant fiber of the invention;

FIG. 19B shows the analysis data of FIG. 19A;

FIG. 20A shows the $^{31}$P solid state NMR analysis of the polyester+phosphorous catalyst+plant fiber of the invention; and FIG. 20B shows the analysis data of FIG. 20A.

DETAILED DESCRIPTION

Figure 1:
FIG. 1 shows the after-blending and prior-to-hot-pressing state of the PLA+APP of the embodiment of the present invention.

The present invention will be clearer from the following description when viewed together with the accompanying drawings, which show, for purpose of illustrations only, the preferred embodiment in accordance with the present invention.

The present invention provides a low temperature carbonizable material and a method for making the same. The low temperature carbonizable material and the method for making the same include polyester polymer materials, biomass material and catalyst. The phosphorous catalyst catalyzes polyester polymer fracture to produce alcohol group and acid group, which further catalyzes the carbonization reaction of the biomass material, and forms a catalytic chain reaction. Through the catalytic chain reaction, carbonization temperature can be effectively lowered and the carbonization time can be shortened.

The composition of the low temperature carbonizable material, the method for making the low temperature carbonizable material and efficacy test thereof are described as follows with reference to tables 1 and 2.

The low temperature carbonizable material of the present invention comprises: 30-60 wt % polyester polymer material, 20-50 wt % biomass material, and 20-50 wt % phosphorous catalyst which catalyzes polyester polymer fracture to produce alcohol group and acid group.

In this embodiment, the polyester polymer material is selected from the group consisting of general polyester, biodegradable polyester and/or waste polyester polymer material. More particularly, the polyester polymer material is selected from PLA (polylactic acid), PBS (polybutylene succinate) or PET (polyethylene terephthalate).

In this embodiment, the biomass material includes cellulose or lignin containing agricultural material and/or agricultural wastes containing lignin or cellulose. More particularly, the biomass material can be selected from pineapple fiber, nano pineapple fiber or bamboo fiber.

In this embodiment, the phosphorous catalyst is selected from phosphoric acid or its compounds, and amine phosphate or its compounds.

The method for making the low temperature carbonizable material comprises the following steps:

a step of material preparation: providing 30-60 wt % polyester polymer material, 20-50 wt % biomass material, and 20-50 wt % phosphorous catalyst, wherein the polyester polymer material is selected from the group consisting of general polyester, biodegradable polyester and/or waste polyester polymer material, the biomass material includes cellulose or lignin containing agricultural material and/or agricultural wastes containing lignin or cellulose, and the phosphorous catalyst is selected from phosphoric acid or its compounds, and amine phosphate or its compounds;

a step of heating: heating the polyester polymer material to a soft state; and a step of blending: blending the polyester polymer material which has been softened with the biomass material and the phosphorous catalyst at a blending temperature above 170° C., wherein the blending step is performed by a stirring device which stirs at a stirring speed of 50-80 rpm (rotation per minute) for 10-30 minutes, and the blending temperature is preferably 170 to 250° C.

In this embodiment, the low temperature carbonizable material made by the aforementioned method can be further processed into a desired shape, for example, it can be pressed into carbonizable films by hot pressing, wherein the hot pressing temperature is determined by the material of the polyester polymer.

In this embodiment, the polyester polymer material is selected from the group consisting of general polyester, biodegradable polyester and/or waste polyester polymer material. More particularly, the polyester polymer material is selected from PLA (polylactic acid), PBS (polybutylene succinate) or PET (polyethylene terephthalate).

In this embodiment, the biomass material includes cellulose or lignin containing agricultural material and/or agricultural wastes containing lignin or cellulose. More particularly, the biomass material can be selected from pineapple fiber, nano pineapple fiber or bamboo fiber.

In this embodiment, the phosphorous catalyst is selected from phosphoric acid or its compounds, and amine phosphate or its compounds.

The method for making the low temperature carbonized material comprises the following steps:

a step of material preparation: providing 30-60 wt % polyester polymer material, 20-50 wt % biomass material, and 20-50 wt % phosphorous catalyst, wherein the polyester polymer material is selected from the group consisting of general polyester, biodegradable polyester and/or waste polyester polymer material, the biomass material includes cellulose or lignin containing agricultural material and/or agricultural wastes containing lignin or cellulose, and the phosphorous catalyst is selected from phosphoric acid or its compounds, and amine phosphate or its compounds;

The present invention provides a low temperature carbonizable material and a method for making the same. The low temperature carbonizable material and the method for making the same include polyester polymer materials, biomass material and catalyst. The phosphorous catalyst catalyzes polyester polymer fracture to produce alcohol group and acid group, which further catalyzes the carbonization reaction of the biomass material, and forms a catalytic chain reaction. Through the catalytic chain reaction, carbonization temperature can be effectively lowered and the carbonization time can be shortened.

The composition of the low temperature carbonizable material, the method for making the low temperature carbonizable material and efficacy test thereof are described as follows with reference to tables 1 and 2.

The low temperature carbonizable material of the present invention comprises: 30-60 wt % polyester polymer material, 20-50 wt % biomass material, and 20-50 wt % phosphorous catalyst which catalyzes polyester polymer fracture to produce alcohol group and acid group.

In this embodiment, the polyester polymer material is selected from the group consisting of general polyester, biodegradable polyester and/or waste polyester polymer material. More particularly, the polyester polymer material is selected from PLA (polylactic acid), PBS (polybutylene succinate) or PET (polyethylene terephthalate).

In this embodiment, the biomass material includes cellulose or lignin containing agricultural material and/or agricultural wastes containing lignin or cellulose. More particularly, the biomass material can be selected from pineapple fiber, nano pineapple fiber or bamboo fiber.

In this embodiment, the phosphorous catalyst is selected from phosphoric acid or its compounds, and amine phosphate or its compounds.

The method for making the low temperature carbonizable material comprises the following steps:

a step of material preparation: providing 30-60 wt % polyester polymer material, 20-50 wt % biomass material, and 20-50 wt % phosphorous catalyst, wherein the polyester polymer material is selected from the group consisting of general polyester, biodegradable polyester and/or waste polyester polymer material, the biomass material includes cellulose or lignin containing agricultural material and/or agricultural wastes containing lignin or cellulose, and the phosphorous catalyst is selected from phosphoric acid or its compounds, and amine phosphate or its compounds;

a step of heating: heating the polyester polymer material to a soft state; and a step of blending: blending the polyester polymer material which has been softened with the biomass material and the phosphorous catalyst at a blending temperature above 170° C., wherein the blending step is performed by a stirring device which stirs at a stirring speed of 50-80 rpm (rotation per minute) for 10-30 minutes, and the blending temperature is preferably 170 to 250° C.

In this embodiment, the low temperature carbonizable material made by the aforementioned method can be further processed into a desired shape, for example, it can be pressed into carbonizable films by hot pressing, wherein the hot pressing temperature is determined by the material of the polyester polymer.

The below table 1 shows the detailed embodiments of the present invention, wherein the biomass material is selected from AF (pineapple fiber), NAF (nano pineapple fiber) or BF (bamboo fiber), and the polyester polymer material is selected from PLA (polylactic acid), PBS (polybutylene succinate) or PET (polyethylene terephthalate). The catalyst is APP (ammonium polyphosphate) or PA (phosphoric acid). The embodiment includes the following groups: PLA+APP, APP+AF, PLA+APP+AF, PLA+APP+BF, PBS+APP+AF, PET+APP+AF, PLA+APP+NAF, PLA+PA+AF, and PET+PA+AF.

| Group | Composition | Weight proportion(wt %) | Surface resistance |
|---|---|---|---|
| Embodiment 1 | PLA + APP | 60:40 | — |
| Embodiment 2 | APP + AF | 50:50 | — |
| Embodiment 3 | PLA + APP + AF | 40:20:40 | $1.84 \times 10^3$ |
| Embodiment 4 | PLA + APP + BF | 40:20:40 | $1.25 \times 10^5$ |
| Embodiment 5 | PBS + APP + AF | 40:20:40 | $1.43 \times 10^3$ |
| Embodiment 6 | PET + APP + AF | 40:20:40 | $2.79 \times 10^3$ |
| Embodiment 7 | PLA + APP + NAF | 40:20:40 | $7.0 \times 10^2$ |
| Embodiment 8 | PLA + PA + AF | 40:20:40 | $2.79 \times 10^2$ |
| Embodiment 9 | PET + PA + AF | 40:20:40 | $9.18 \times 10^2$ |

Biomass material:
AF (pineapple fiber), NAF (nano pineapple fiber), BF (bamboo fiber);
polyester polymer material:
PLA (polylactic acid), PBS (polybutylene succinate), PET (polyethylene terephthalate);
Catalyst:
APP (ammonium polyphosphate), PA (phosphoric acid)

Embodiment 1: PLA+APP Group

Figure 2:
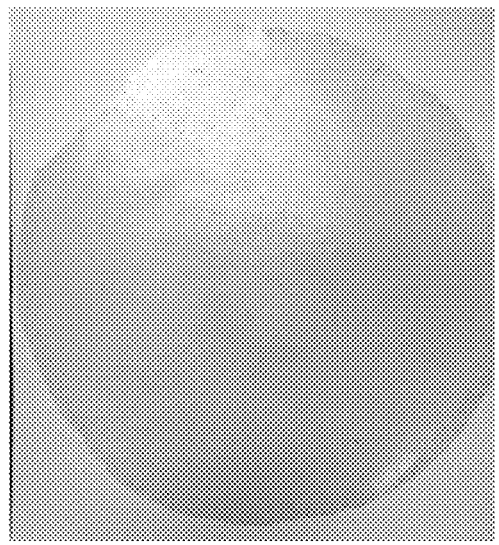
FIG. 2 shows after-hot-pressing state of the PLA+APP of the embodiment of the present invention.

The composition of the embodiment 1 includes: 60 wt % PLA (polylactic acid) and 40 wt % APP (ammonium polyphosphate). FIG. 1 shows the after-blending state of the product of the embodiment 1. FIG. 2 shows the state of the product of embodiment 1 after hot pressing at a temperature of 175° C. It is observed that no carbonization occurs after the embodiment 1 is hot pressed.

Embodiment 2: APP+AF

Figure 3:
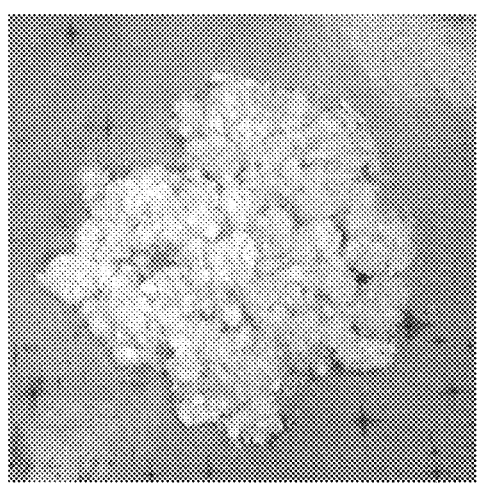
FIG. 3 shows the state of the APP+AF of the embodiment of the present invention prior to the steps of blending and hot pressing.
Figure 4:
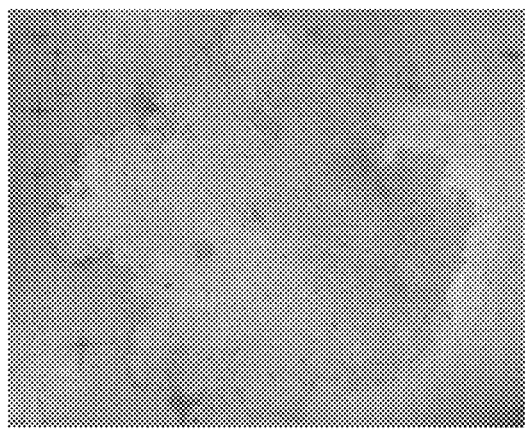
FIG. 4 shows the state of the APP+AF of the embodiment of the present invention after hot pressing at 175° C. for 1 hour.

The composition of the embodiment 2 comprises: 50 wt % APP (ammonium polyphosphate) and 50 wt % AF (pineapple fiber). FIG. 3 shows the state of the product of the embodiment 2 prior to hot pressing, and FIG. 4 shows the degree of carbonization after the product of the embodiment 2 has been hot pressed at 175° C. for 1 hour. It is observed that no carbonization is found after the product of the embodiment 2 has been hot pressed at 175° C. for 1 hour.

Embodiment 3: PLA+APP+AF

Figure 5:
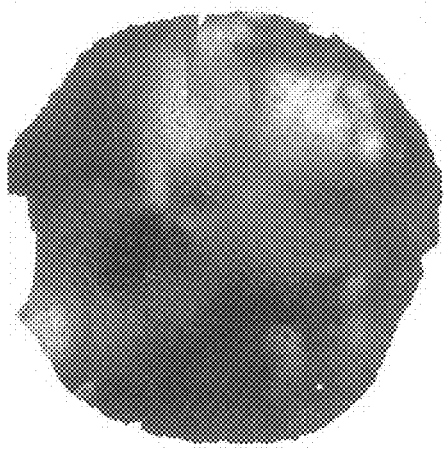
FIG. 5 shows the state of the PLA+APP+AF of the embodiment of the present invention after the steps of blending and hot pressing.
Figure 6:
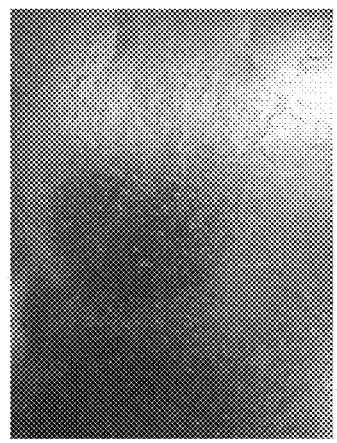
FIG. 6 is an enlarged view of a part of FIG. 5.

The composition of the embodiment 3 comprises: 40 wt % PLA (polylactic acid), 20 wt % APP (ammonium polyphosphate) and 40 wt % AF (pineapple fiber). The surface resistance of the product of embodiment 3 is $1.84 \times 10^3 \Omega/\square$. FIG. 5 shows the state of the product of the embodiment 3 after blending at 180° C. and 170° C. hot pressing. FIG. 6 is a magnified view of a part of FIG. 5. It is observed that the product of the embodiment 3 has the advantages of good resilience, good film-forming property, fully completed carbonization and low resistance.

Embodiment 4: PLA+APP+BF

Figure 7:
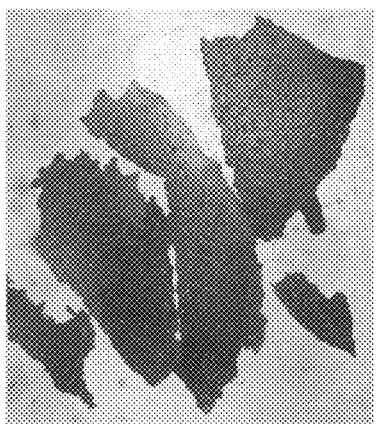
FIG. 7 shows the state of the PLA+APP+BF of the embodiment of the present invention after the steps of blending and hot pressing.
Figure 8:
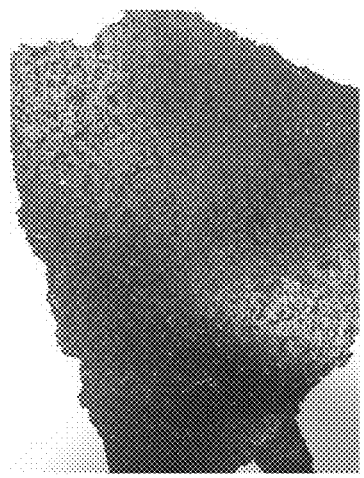
FIG. 8 is an enlarged view of a part of FIG. 7.

The composition of the embodiment 4 includes: 40 wt % PLA (polylactic acid), 20 wt % APP (ammonium polyphosphate) and 40 wt % BF (bamboo fiber). The surface resistance of the product of embodiment 4 is $1.25 \times 10^5 \Omega/\square$. FIG. 7 shows the state of the product of the embodiment 4 after 180° C. blending and 175° C. hot pressing. FIG. 8 is a magnified view of a part of FIG. 7. It is observed that the product of the embodiment 4 is brittle and has poor film-forming property, incomplete carbonization with visible fibers, and high resistance.

Embodiment 5: PBS+APP+AF

Figure 9:
FIG. 9 shows the state of the PBS+APP+AF of the embodiment of the present invention after the steps of blending and hot pressing.
Figure 10:
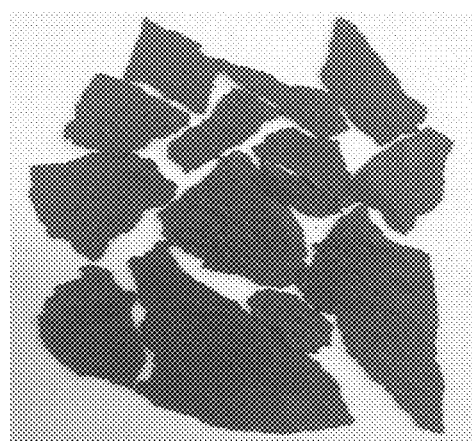
FIG. 10 shows the state of the PET+APP+AF of the embodiment of the present invention after the steps of blending and hot pressing.

The composition of the embodiment 5 includes: 40 wt % PBS (polybutylene succinate), 20 wt % APP (ammonium polyphosphate) and 40 wt % AF (pineapple fiber). The surface resistance of the product of embodiment 5 is $1.43 \times 10^3 \Omega/\square$. FIG. 9 shows the state of the product of the embodiment 5 after 175° C. blending and 175° C. hot pressing. It is obvious that the product of the embodiment 5 is fully carbonized.

Embodiment 6: PET+APP+AF

The composition of the embodiment 6 includes: 40 wt % PET (polyethylene terephthalate), 20 wt % APP (ammonium polyphosphate) and 40 wt % AF (pineapple fiber). The surface resistance of the product of embodiment 6 is $2.79 \times 10^3 \Omega/\square$. FIG. shows the state of the product of the embodiment 6 after 225° C. blending and 215° C. hot pressing. It is obvious that the product of the embodiment 6 is fully carbonized.

Embodiment 7: PLA+APP+NAF

Figure 11:
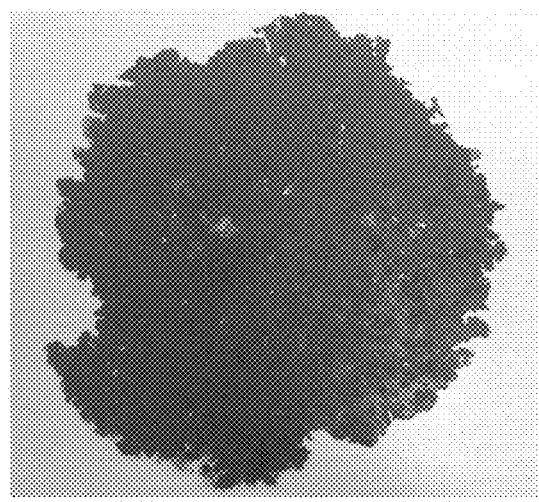
FIG. 11 shows the state of the PLA+APP+NAF of the embodiment of the present invention after the steps of blending and hot pressing.
Figure 12:
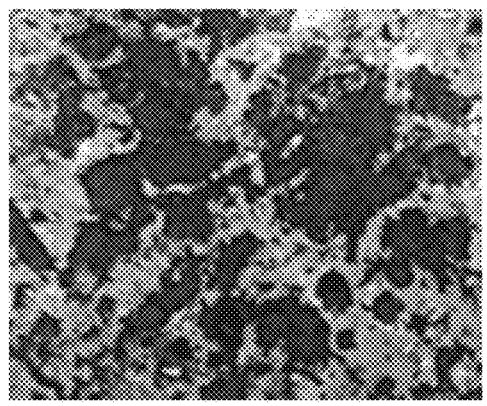
FIG. 12 shows the product of PLA+PA+AF of the embodiment of the present invention.
Figure 13:
FIG. 13 shows the product of PET+PA+AF of the embodiment of the present invention.

The composition of the product of the embodiment 7 includes: 40 wt % PLA (polylactic acid), 20 wt % APP (ammonium polyphosphate) and 40 wt % NAF (nano pineapple fiber). The surface resistance of the product of embodiment 7 is $7.0 \times 10^2 \Omega/\square$. FIG. 11 shows the state of the product of the embodiment 7 after 180° C. blending and 175° C. hot pressing. It is obvious that the product of the embodiment 7 is fully carbonized, and the resistance is low.

Embodiment 8: PLA+PA+AF

The composition of the product of the embodiment 8 includes: 40 wt % PLA (polylactic acid), 20 wt % PA (phosphoric acid) and 40 wt % AF (pineapple fiber). The surface resistance of the product of embodiment 8 is $2.79 \times 10^2 \Omega/\square$. FIG. 11 shows the state of the product of the embodiment 8 after 180° C. blending and 175° C. hot pressing. It is obvious that the product of the embodiment 8 is almost fully carbonized, and the resistance is low.

Embodiment 9: PET+PA+AF

The composition of the product of the embodiment 9 includes: 40 wt % PET (polyethylene terephthalate), 20 wt % PA (phosphoric acid) and 40 wt % AF (pineapple fiber). The surface resistance of the product of embodiment 9 is $9.18 \times 10^2 \Omega/\square$. FIG. 11 shows the state of the product of the embodiment 9 after 180° C. blending and 175° C. hot pressing. It is observed that the product of the embodiment 3 has the advantages of good resilience, good film-forming property, fully completed carbonization and low resistance.

Please refer to FIGS. 14A-20B in combination with of the below table 2, which are $^{13}C$ solid state NMR analysis and $^{31}P$ solid state NMR analysis of the materials of the embodiments of the present invention.

Figure 14A:
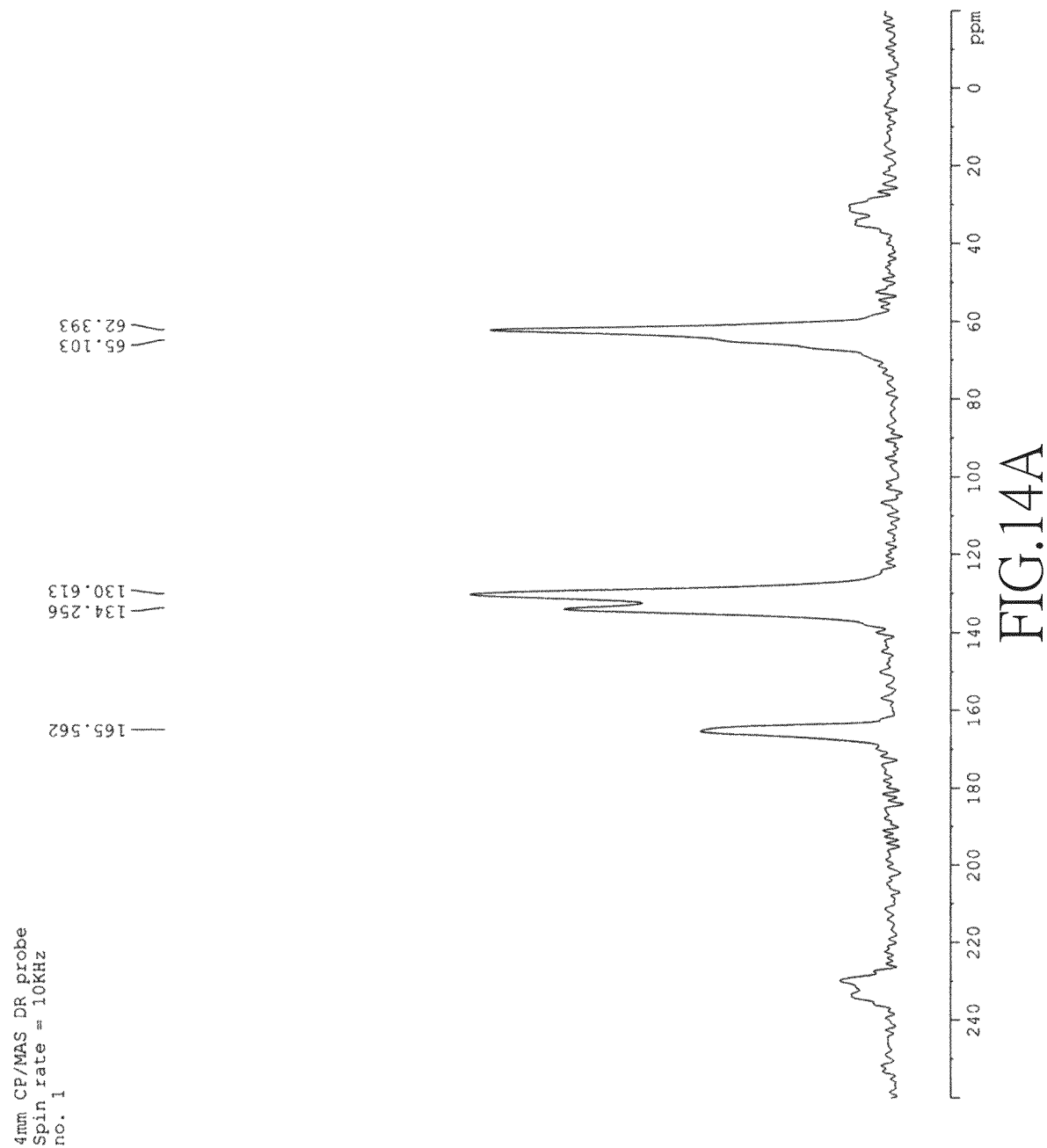
FIG. 14A shows the $^{13}$C solid state NMR analysis of the polyester of the invention.
Figure 15A:
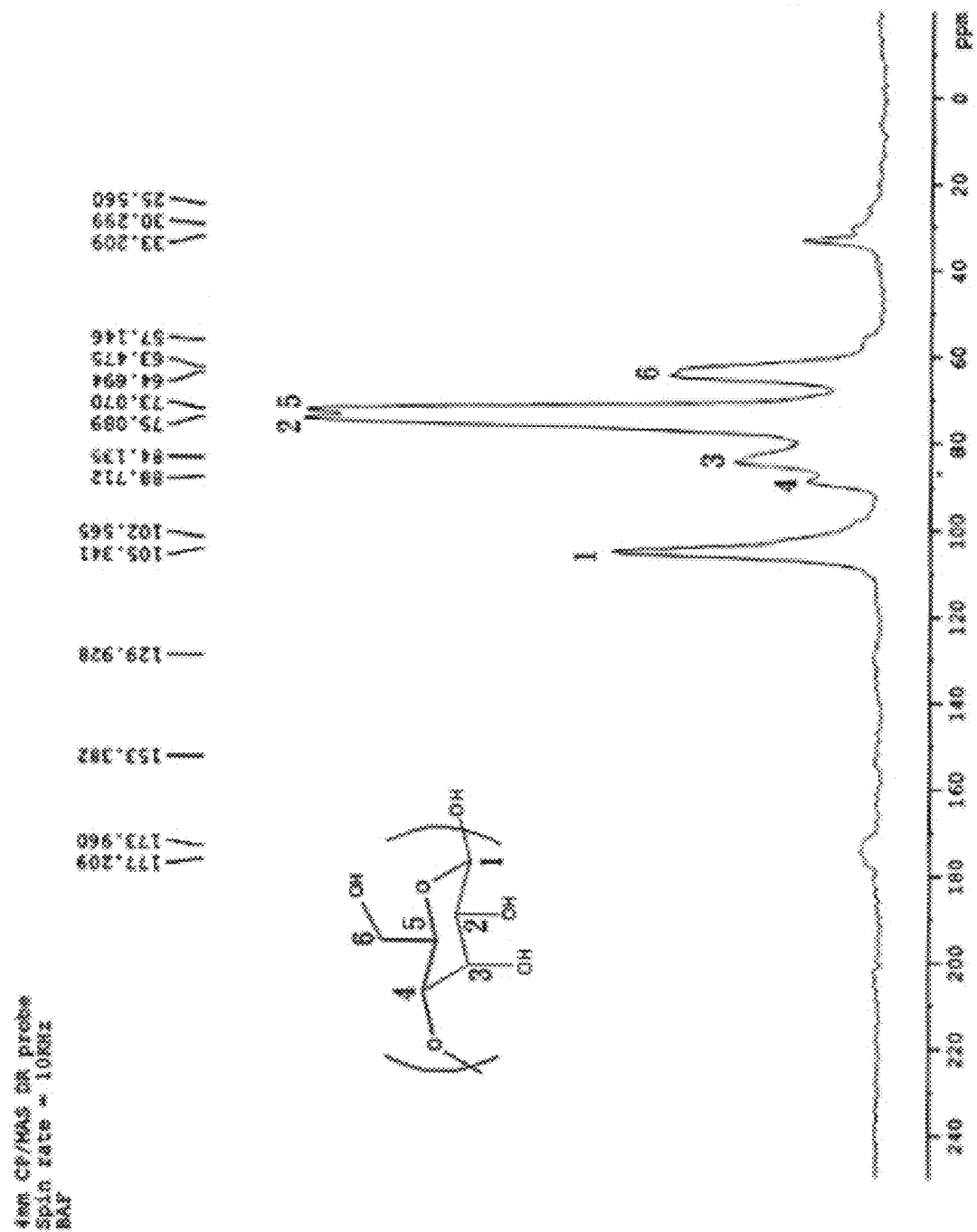
FIG. 15A shows the $^{13}$C solid state NMR analysis of the plant fiber of the invention.
Figure 16A:
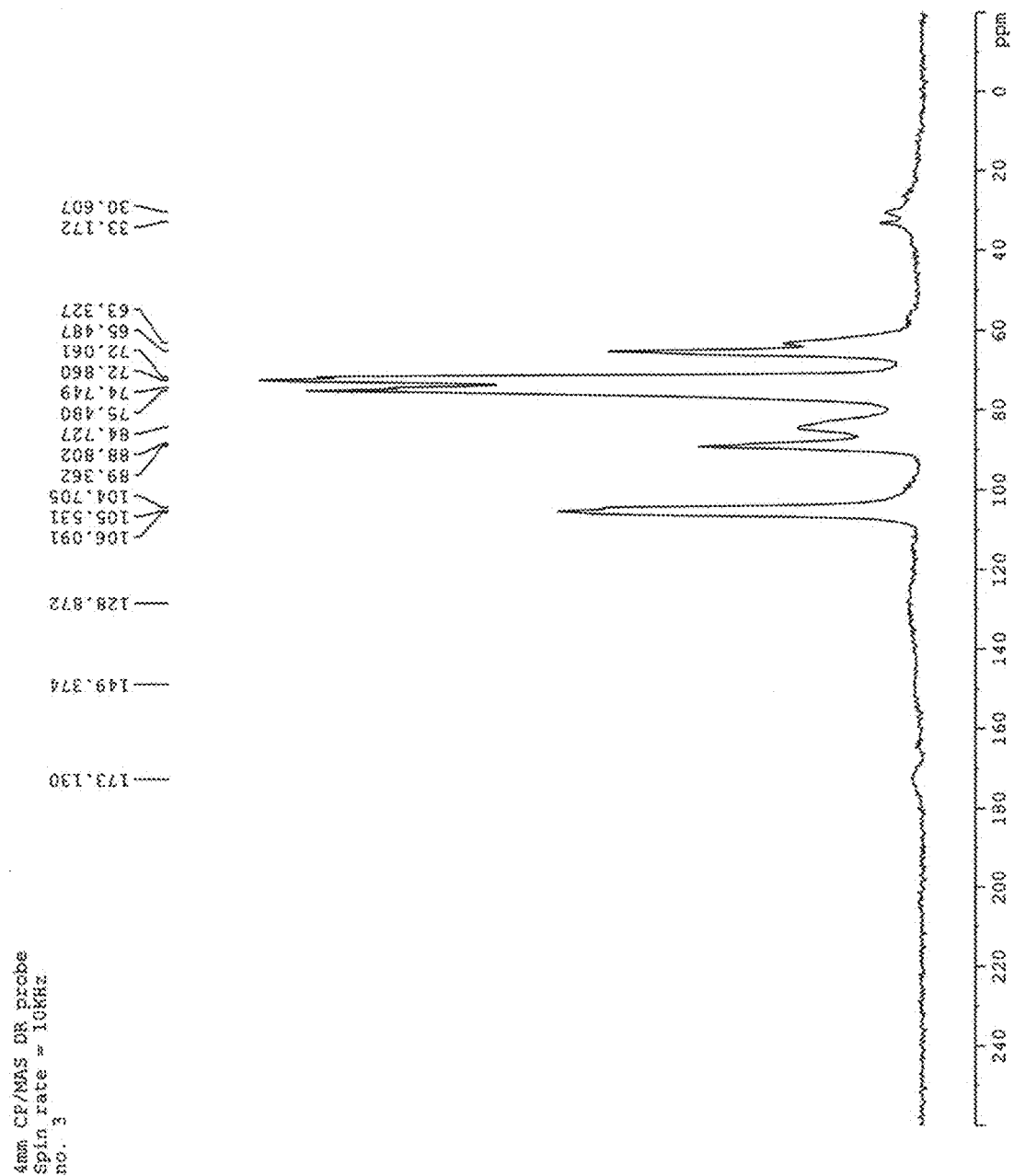
FIG. 16A shows the $^{13}$C solid state NMR analysis of the phosphorous catalyst+plant fiber of the invention.

FIG. 14A shows the $^{13}C$ solid state NMR analysis of the polyester of the invention, FIG. 14B shows the analysis data of FIG. 14A, FIG. 15A shows the $^{13}C$ solid state NMR analysis of the plant fiber of the invention, FIG. 15B shows the analysis data of FIG. 15A, FIG. 16 shows the $^{13}C$ solid state NMR analysis of the phosphorous catalyst+plant fiber of the invention, FIG. 16B shows the analysis data of FIG. 16A, FIG. 17A shows the $^{13}C$ solid state NMR analysis of the polyester+the phosphorous catalyst+plant fiber of the invention, and FIG. 17B shows the analysis data of FIG. 17A. It is learned from FIG. 16A that the characteristic absorption peak of the plant fiber still exists, which is similar to FIG. 15A, and when only the phosphorus catalyst and plant fiber are used, the plant fiber can not be effectively carbonized by low temperature hot pressing. Besides, it can be seen by comparing FIG. 17A with FIG. 15A that the characteristic absorption peak of the plant fiber nearly does not exist, which shows that in the presence of polyester+phosphorous catalyst+plant fiber, low temperature hot pressing can make the plant fiber effectively carbonized.

Figure 18A:
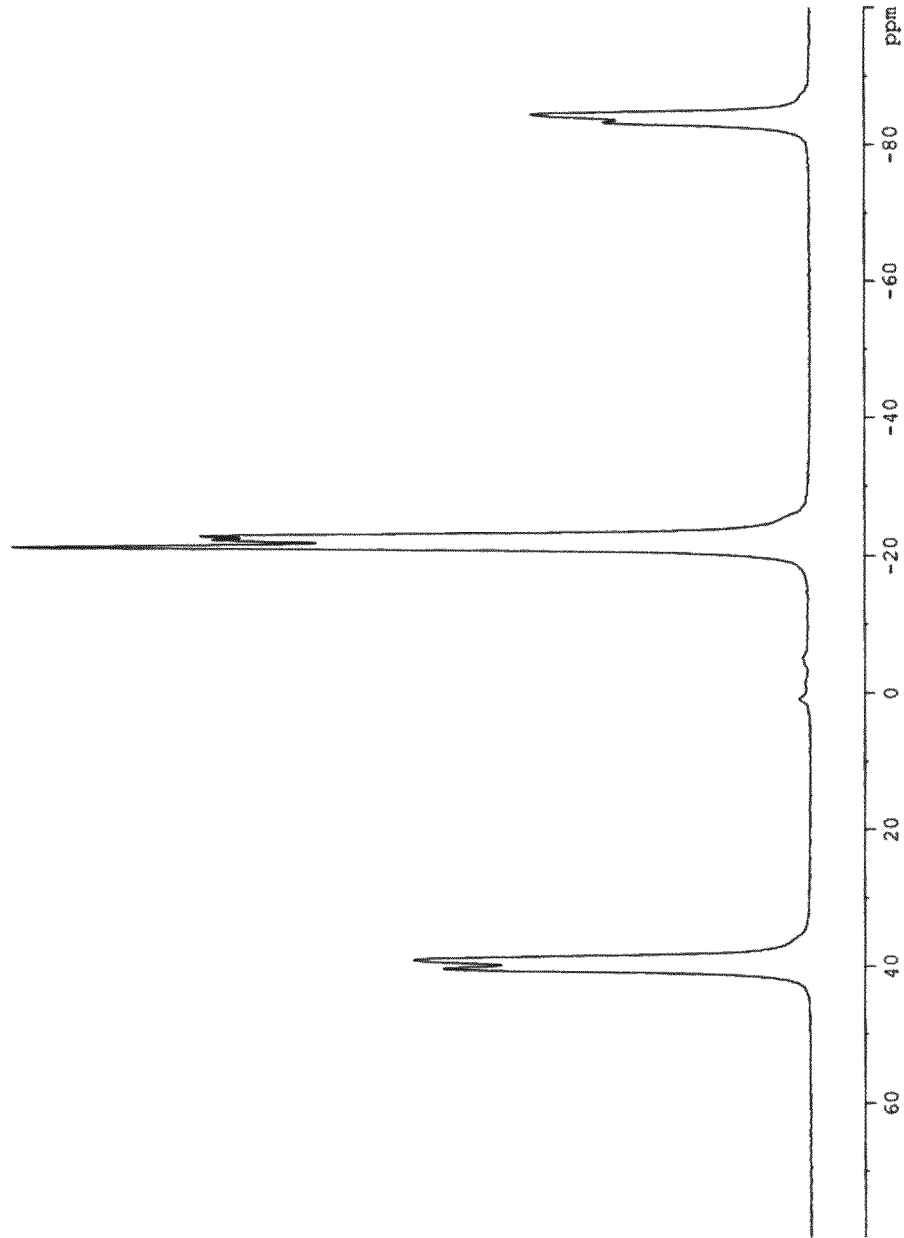
FIG. 18A shows the $^{31}$P solid state NMR analysis of the phosphorous catalyst of the invention.

FIG. 18A shows the $^{31}P$ solid state NMR analysis of the phosphorous catalyst of the invention, FIG. 18B shows the analysis data of FIG. 18A, FIG. 19A shows the $^{31}P$ solid state NMR analysis of the phosphorous catalyst+plant fiber of the invention, FIG. 19B shows the analysis data of FIG. 19A, FIG. 20A shows the $^{31}P$ solid state NMR analysis of the polyester+phosphorous catalyst+plant fiber of the invention, and FIG. 20B shows the analysis data of FIG. 20A. Comparing FIG. 19A with FIG. 18A can see that the characteristic absorption peak of the phosphoric acid (at the position 0 ppm) is very obvious, when only the phosphorus catalyst and plant fiber are used, low temperature hot pressing cannot make the phosphorous catalyst fully reacted, and as a result, the plant fiber cannot be effectively carbonized. Besides, comparing FIG. 20A with FIG. 18A can see that the characteristic absorption peak of the phosphoric acid is substantially reduced, which shows that in the presence of polyester+phosphorous catalyst+plant fiber, low temperature hot pressing can make the phosphorous catalyst fully reacted to cause effective carbonization of the plant fiber.

Please refer to the below table 2, which is the analysis on the degree of carbonization of the formula containing 40 wt % plant fiber, the results show that the degree of the plant fiber carbonization is greater than 90% when hot pressing is performed longer than 30 minutes.

TABLE 2

| Hot pressing (minute) | Carbonization degree of plant fiber (%) |
| --- | --- |
| 5 | 44 |
| 10 | 45 |
| 15 | 49 |
| 20 | 64 |
| 25 | 86 |
| 30 | 89 |
| 35 | 91 |
| 40 | 95 |

Currently, the polymer or biomass material needs to be heated in a furnace for several hours in order to be carbonized, and the after-carbonization product has no plasticity, is difficult for mold forming, and cannot be made into films, which results in a low added value and limited applicability. When the present invention uses the polyester polymer material (general polyester and biodegradable polyester), the biomass material (cellulose or lignin containing agricultural material), and the phosphorous catalyst as raw materials for making low temperature carbonization material, the phosphorous catalyst catalyzes polyester polymer fracture to produce alcohol group and acid group, which forms a catalytic chain reaction to further catalyze the carbonization reaction of the biomass material. Besides, the catalytic chain reaction can also effectively lower the carbonization temperature, which allows the carbonization process to be completed within 30 minutes at a temperature of 200° C., so that the obtained product can be more easily molded.

In particularly, let's take the film formed by hot pressing the low temperature carbonizable material of the embodiment, its surface resistance can be as low as $3\times10^3\Omega/\square$, which is lower $10^{19}$ than the resistance of the polymeric membrane, and is close to the resistance ($3\times10^3\Omega/\square$) of the conducting polymer coating on a polyester fabric. Therefore, as compared to the carbonizable material or conducting polymer material obtained by other high temperature processes, the low temperature carbonizable material obtained by the invention has the advantages of low temperature low cost, and being environmental friendly, energy saving and easy for molding.

The polyester material used in the invention can also be waste polyester polymer material (general polyester and biodegradable polyester) and the biomass material (cellulose or lignin containing agricultural material). The waste PET bottle is made from PET which is a polyester polymer material. The annual recycling of PET in Taiwan is about 90000 tons, which is a huge quantity equal to a recovery of 4.5 billion 600 ml PET bottles. Polylactic acid is a biodegradable polymer, the decomposition of the abandoned soil biological in soil will produce $CO_2$, thus increasing $CO_2$ emission. Although some scholars have put forward the method for recycling PET bottles and waste polylactic acid by pyrolysis, but the energy yield is not good as expected. At present, the disposal of agricultural waste is to discard waste away or burn it, which causes environmental pollution. Hence, with the low temperature carbonizable material of the invention and the method for making the same, the waste PET bottles or waste polylactic acid can be made into recyclable carbonization material. In addition to reducing the amount of garbage hoarding and $CO_2$ emission, the present invention is further capable of recycling the waste, and increasing industrial output.

In conclusion, the present invention can effectively recycle the waste polyester polymer and agriculture waste, and the catalytic chain reaction of the phosphorous catalyst allows carbonization to be performed at a low temperature without the use of furnace, which is not only environmental friendly, but also effectively reduces the cost. Besides, due to the ease of processing, the products of the present invention can be further processed into activated carbon, fire retardant, thermal conductive material, reinforcing material, etc.

While we have shown and described various embodiments in accordance with the present invention, it is clear to those skilled in the art that further embodiments may be made without departing from the scope of the present invention.

What is claimed is:

1. A low temperature carbonizable material, comprising:
    30-60 wt % polyester polymer material, wherein the polyester polymer material is selected from the group consisting of general polyester, biodegradable polyester and waste polyester polymer material;
    20-50 wt % biomass material, wherein the biomass material is selected from a group consisting of cellulose or lignin containing agricultural material and agricultural wastes containing lignin or cellulose;
    and 20-50 wt % phosphorous catalyst which catalyzes polyester polymer fracture to produce alcohol group and acid group.

2. The low temperature carbonizable material as claimed in claim 1, wherein the polyester polymer material is selected from a group consisting of polylactic acid, polybutylene succinate and polyethylene terephthalate.

3. The low temperature carbonizable material as claimed in claim 1, wherein the biomass material is selected from a group consisting of pineapple fiber, nano pineapple fiber and bamboo fiber.

4. The low temperature carbonizable material as claimed in claim 1, wherein the phosphorous catalyst is selected from a group consisting of phosphoric acid, phosphoric acid compounds, amine phosphate and amine phosphate compounds.

5. A method for making a low temperature carbonizable material, comprising:
    a step of material preparation: providing the polyester polymer material, the biomass material, and the phosphorous catalyst as claimed in claim 1;
    a step of heating: heating the polyester polymer material to a soft state; and
    a step of blending: blending the polyester polymer material which has been softened in the previous step with the biomass material and the phosphorous catalyst at a blending temperature 170 to 250° C.

6. The method as claimed in claim 5, wherein the step of blending further comprises a stirring step which is performed by a stirring device stirring at a stirring speed of 50-80 rpm.

7. The method as claimed in claim 6, wherein the stirring step is performed for 10-30 minutes.

* * * * *